June 23, 1970 P. BLANCHARD 3,516,783
PROCESS FOR REMOVING OZONE FROM OZONE-LOADED AIR
Filed March 9, 1966 2 Sheets-Sheet 2

Inventor:
PAUL BLANCHARD ized June 23, 1970

United States Patent Office 3,516,783
Patented June 23, 1970

3,516,783
PROCESS FOR REMOVING OZONE FROM OZONE-LOADED AIR
Paul Blanchard, Paris, France, assignor to Compagnie General des Eaux, Paris, France, a French body corporate
Filed Mar. 9, 1966, Ser. No. 532,952
Claims priority, application France, Mar. 12, 1965, 8,945; Feb. 28, 1966, 51,297
Int. Cl. B01d 53/00
U.S. Cl. 23—4    6 Claims

ABSTRACT OF THE DISCLOSURE

Ozone is removed from ozone-loaded air such as that escaping from the contact chambers of ozonization plants treating drinking water by passing the air through a layer of activated hardwood charcoal in granular form having a pH of from 12 to 13 so that the pressure differential due to the passage of the air through the layer is lower than 200 mm. of water. The active granular material is maintained at a temperature within the range of about 15° C. to about 60° C.

The present invention relates to a process for removing the ozone contained in air loaded with this gas.

The use of ozone for the treatment of drinking water is generally effected in contact towers or chambers, either by dispersing this gas in water as fine bubbles by suitable means such as injectors, porous units, and the like, or by mixing a concentrated aqueous ozone solution with the water to be treated. In any case, air loaded with residual ozone escapes at the top of the contact chambers, which air is vented off into the atmosphere and is liable to be harmful or objectionable to the neighbourhood.

Therefore, an object of the present invention is to provide a process for destroying the ozone contained in air loaded with this gas and particularly in the air escaping from the contact chambers of ozonization plants.

The process according to the invention comprises passing the ozone-loaded air through a layer of activated hardwood charcoal in granular form having a pH of from 12 to 13, so that the pressure differential due to the passage of air through said layer is less than 200 mm. water, the granular active material being maintained at a temperature within the range of about 15° C. to about 60° C.

Other features and advantages of the invention will become apparent from the following description.

Figure 1:
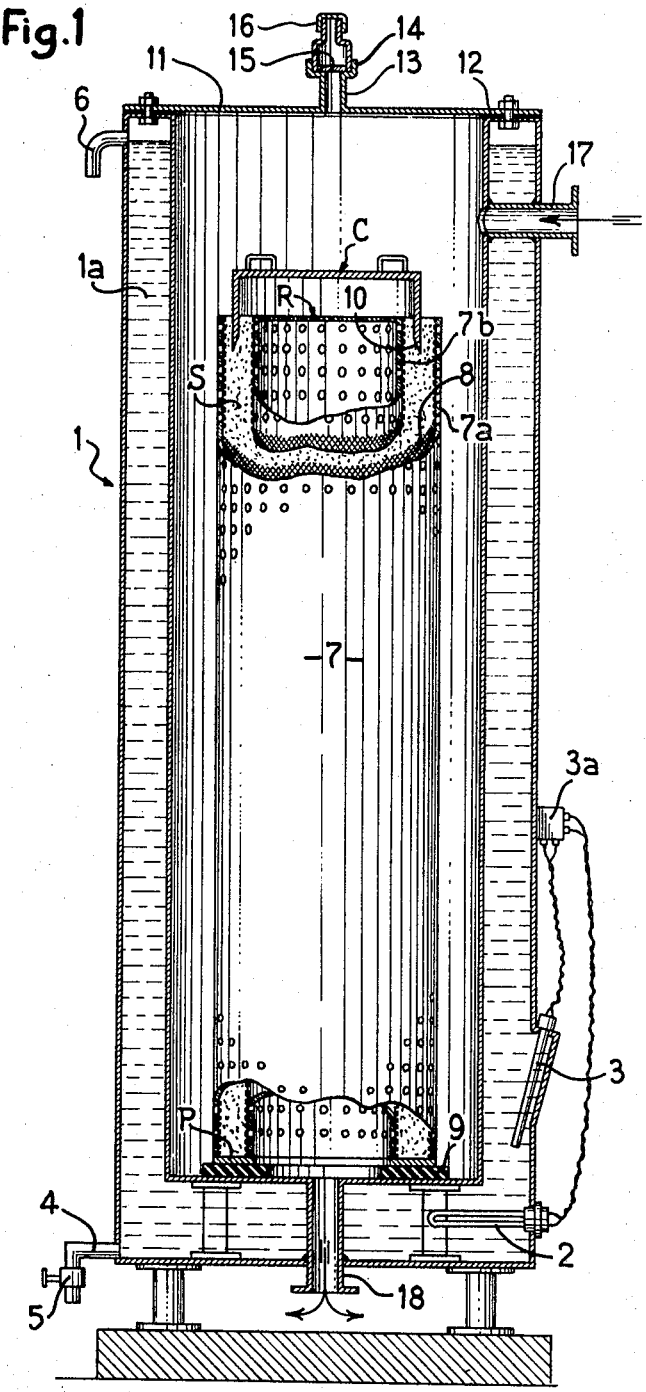
Figure 2:
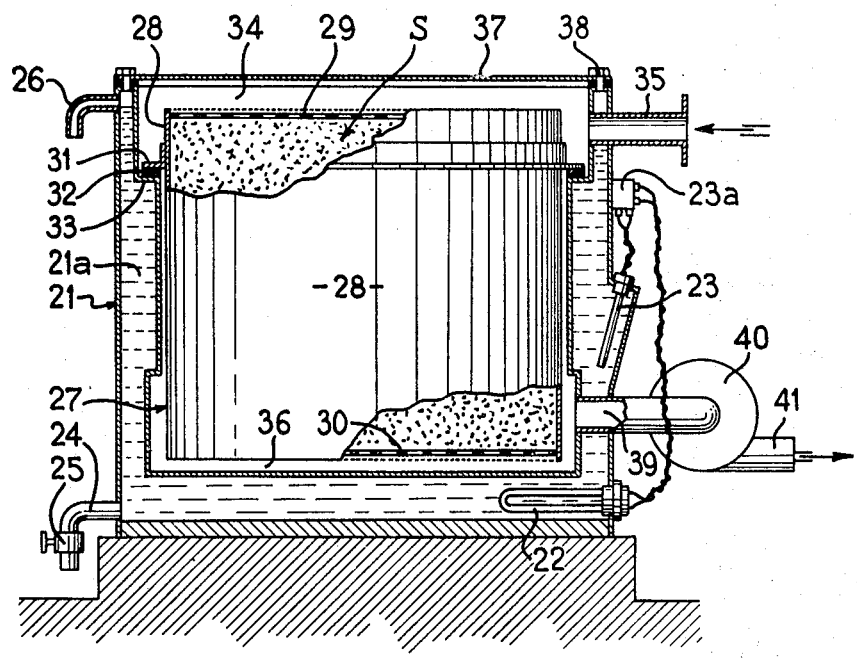

In the accompanying drawing given for illustrative purposes only, FIG. 1 is a longitudinal sectional view of an embodiment of the apparatus for the removal of ozone and FIG. 2 is a view similar to FIG. 1 of a second embodiment of the apparatus.

According to the invention, to remove from air the ozone it contains, the air is passed through a layer of active material capable of destroying the ozone. This material is an activated carbon, e.g. coconut shell carbon, or more preferably activated carbon obtained from hardwood and exhibiting a high alkalinity. The nature of the reactions according to which this destruction is effected is not fully understood, although it is assumed this reaction is likely to be of catalytic nature. However, with activated carbons, a slight consumption of the active material is found to occur during the process.

It is necessary that the active material be in a granular form because the use of powdered material leads either to a reaction having an explosive character or to a rapid clogging of the layer with the humidity contained in the treated air which is generally highly moist.

The particle size to be selected depends on the active material used, however the granules possess advantageously a particle size of 1 to 20 mm. Below 1 mm., the above-mentioned drawbacks are found to occur, and above 20 mm. there is insufficient contact between the air to be treated and the active material. The thickness of the layer may be varied within fairly wide limits depending on the material used and the particle size thereof, however, on application of the process according to the invention, the pressure differential across the layer of active material should remain relatively low and lower than 200 mm. water, generally lower than 10 mm. water.

It is particularly advantageous that the rate of flow of the ozone-loaded air be maintained constant throughout the operation.

It is also necessary that the active material be maintained at a temperature comprised within a fairly narrow range of from about 15° C. to about 60° C. so as to prevent, on the one hand, a water absorption or adsorption by the active material and, on the other hand, to prevent too vigorous a reaction.

Tests have shown that in addition to the disappearance of the activated carbon which occurs by slow combustion under the oxidizing action of ozone, there occurs a gradual inhibition of the activated carbon by some kind of poisoning of the granule surface. Such poisoning is actually due to the formation of soluble carboxylic compounds of acidic character which gradually fill in the pores of the activated carbon and make it lose progressively its efficiency.

It has now been found that the formation and the reaction of such acidic carboxylic acids may be efficiently precluded by the use of an activated carbon having a lower bulk density than the activated carbon made from coconut shells or from agglomerated inorganic materials (mineral coal, peat, lignite) and especially of markedly more alkaline character than the latter activated carbons.

For comparative experiments, activated carbon granules prepared from hardwood (beech, hornbeam and oak) with a high alkaline ash content (6–12% by weight of ash composed almost entirely of potassium and calcium carbonate) and also coconut shell activated carbon wherein the ash content is of the order of only 1–2%, said ash content being predominantly silica, the potassium and calcium carbonates representing at most 1% by weight of the activated carbon. Comparative experiments were also effected using activated carbons with a high inorganic (silica and alumina) ash content wherein, however, the potassium and calcium carbonates were present in the same low percentage of about 1%.

Some of the resulting data are given in the tables below:

TABLE I—LABORATORY TESTS

| Test No. | Flow rate of ozone-loaded air, l./hr. | Rate of passage, cm./sec. | Type of activated carbon | pH | Life, hrs. | Destruction coefficient [2] |
|---|---|---|---|---|---|---|
| | | | Coconut shell carbon: | | | |
| 1 | 150 | 1.15 | NC 35 CECA | 9.9 | 621 | 2.26 |
| 2 | 150 | 1.64 | Normal DO PICA | 9.9 | 515 | 1.70 |
| 3 | 150 | 1.64 | Inorganic carbon: Normal SIM PICA | 9.5 | 42 | 0.14 |
| | | | Hardwood carbon: | | | |
| 4 | 150 | 1.64 | Normal CSO PICA | 10.8 | 643 | 2.10 |
| 5 | 150 | 1.40 | Super CSO PICA | 12.4 | 960 | 5.4 |
| 6 | 150 | 1.64 | ....do | 12.3 | 835 | 4.8 |
| 7 | 150 | 0.93 | ....do | 12.3 | 1,264 | 4.03 |
| 8 | 300 | 1.93 | ....do | 12.3 | 592 | 4.08 |

See footnotes at end of Table II.

TABLE II—INDUSTRIAL TESTS

| Test No. | Flow rate of ozone-loaded air, l./hr. | Rate of passage, cm./sec. | Type of activated carbon | pH | Life, hrs. | Destruction coefficient [2] |
|---|---|---|---|---|---|---|
| | | | Coconut shell: | | | |
| 9 | 225,000 | 2.90 | NC 35 CECA | 9.9 | 250 | 1.30 |
| 10 | 200,000 | 2.60 | Normal DO PICA | 9.9 | 288 | 1.50 |
| | | | Hardwood: | | | |
| 11 | 78,000 | 1.00 | Super CSO PICA | 12.3 | 632 | 2.94 |
| 12 | 60,000 | 5.70 | ....do | 12.3 | 800 | 3.73 |

[1] Life is the time during which the air having passed through the carbon contains no residual ozone.
[2] As kg. $O^3$ destroyed per kg. activated carbon.

In the above tables, the ozone-loaded air sent through the activated carbon contained about 3 g. ozone per cubic meter.

The activated carbons listed in the tables are sold by Société Nouvelle PICA, Paris, France, and by Société CECA, Paris, France.

Carbons NC 35 CECA and Normal DO PICA are activated carbons obtained from coconut shells and having a pH of about 9.9. Carbon Normal SIM is an inorganic activated coal carbon having a pH of about 9.

Carbon Normal CSO is an activated carbon obtained from hardwood (beech, hornbeam or oak) having a pH of about 10.8.

Carbon Super CSO is an activated carbon of same origin than carbon Normal CSO, however, more highly activated than the latter, having a pH of about 12.3.

Activation of these carbons is effected with high temperature steam.

From an examination of the tables it is apparent that, while the coconut shell activated carbons are markedly superior to the carbons of inorganic origin, the best results are obtained with hardwood carbons that have a higher pH value of from 10 to 13 and preferably greater than 12. It was also discovered that the activated carbons giving the best results were those having the lowest inorganic content, organic materials promoting in the presence of ozone the formation of oxidation compounds that poison the activated carbon and decrease its life.

The use of the strongly alkaline activated carbons defined above that may be employed until complete exhaustion makes it unnecessary to arrange the activated carbon in a thin layer as is generally the case with other active materials, and in contrast, to minimize the loss of activated carbon due to the slow ozone-induced combustion, it is advantageous to operate with the greatest layer thickness compatible with the collapse of the residual ash skeleton and with the pressure differential to be maintained which should be lower than 200 mm. water.

With such improved highly alkaline activated carbons it is possible to operate at higher temperatures of up to about 60° C., whereas, generally, with the other active materials according to the invention a temperature of about 40° C. should not be exceeded.

Referring now to FIG. 1 of the drawing, the apparatus for the removal of ozone comprises a vertical metal casing 1 having two walls forming a closed chamber 1a filled with water and maintained at a fixed temperature by means of shielded electric resistances 2 controlled by a thermostat 3 and a switch 3a. A conduit 4 fitted with a valve 5 permits the supply and the discharge of water; a conduit 6 serves as overflow and vent. In this casing 1 with controlled temperature is concentrically located an annular contacting unit or basket 7 having two concentric perforated walls 7a and 7b in an ozone-proof material such as stainless steel perforated sheets. Fine-mesh metal screens inert to ozone line the inner surfaces of this annular unit which is closed at its base by means of an annular plate P and at its top, in its inner circular portion, by a plate R. Basket 7 rests on a flexible ring-shaped gasket 9 bearing against the bottom of casing 1. This basket is filled up to its top, between walls 7a and 7b, with active material S. A closing device C of cylindrical bell shape with bevelled edge 10 bears freely against the active material; by its own weight, this bell penetrates into the active material and constitutes a moving seal which follows the surface of the active material as the latter is consumed.

The apparatus is closed at its top with a cover 11 bolted to an upper flange of casing 1 through a square cross-sectional gasket 12 of a flexible material inert to ozone. From the center portion of this cover extends a conduit 13 comprising a connection 14 equipped with a plastic ozone-proof disc 15 punched at its center, the tubing being closed with a threaded plug 16. With this device, a thin tapered probe may be introduced, after removing closing device 16, to locate the position of bell C without loss of gas and thereby to determine the time at which a replenishment in active material is necessary in the annular contacting unit 7.

The thermostated casing 1 bears also at its top a conduit 17 welded to both walls through which the ozone-loaded air is admitted into the casing and, at its bottom, a second conduit 18 permitting the discharge of the ozone-freed air from the inner space defined by the wall 7b and the plate R.

The operation of the above described apparatus will now be set forth by means of the following embodiment which is not to be considered limiting on the scope of the present invention:

In contacting unit 7 are loaded 200 kg. activated coconut shell carbon having a particle size of 2.8 to 3 mm., the thickness of the layer being about 12 cm. between walls 7a and 7b.

By means of resistances 2, the temperature of the casing is brought up to a value that will be maintained within the range from 25 to 35° C. throughout the test.

Ozone-loaded air from a water-treatment plant and containing in average 2.74 g. ozone per m.$^3$ of air is introduced through conduit 17, a flow rate of 225 m.$^3$/hr. being maintained. After reheating in casing 1, this air passes through the layer of activated carbon located between walls 7a and 7b of the contacting unit and gathers in the center space of said unit from which it is removed by conduit 18. The pressure differential across the activated carbon layer is 3 mm. water and the contact time is 3.48 seconds. The air is uninterruptedly passed under the above conditions for 621 hours and it is found that the air issuing from conduit 18 does not practically contain any ozone even at the end of the test. An activated carbon consumption corresponding to about 1 g. for 12 g. ozone was observed.

Referring now to FIG. 2 of the accompanying drawing, there is seen another embodiment of the apparatus carbons.

The apparatus comprises a vertical metal casing 21 having two walls forming a chamber 21a filled with a liquid such as water, and maintained at a determined temperature by means of electric resistance 22 controlled by a thermostat 23 and a switch 23a. A conduit 24 fitted with a valve 25 permits the supply and the discharge of the liquid and a conduit 26 serves as overflow at the top.

Inside casing 21 is located a contacting unit constituted by a basket 27 comprising a cylindrical wall 28 and at its upper and lower ends two perforated sheets 29 and 30, respectively, preferably lined with fine mesh metal screens. The basket is filled with active material S, particularly highly alkaline activated carbon such as described above. Wall 37 is equipped outwardly with a flange 31 resting, through ozone-proof gaskets 32, on a shoulder 33 of the inner wall of casing 21. With this arrangement, the basket is supported inside the casing which is separated into an inlet chamber 34 wherein emerges a supply conduit 35 for the ozone-loaded air to be treated and an outlet chamber 36 where the ozone-freed air having passed through the contacting unit is gathered. The inlet chamber is closed at the top with a plate 37 attached to the casing by means, for example, of bolts 38 with interposition of ozone-resistant gaskets. A conduit 39 connects the outlet chamber with an exhausting device such as exhaust fan 40 which sends the ozone-freed air into a discharge conduit 41.

The apparatus is operated as follows: the ozone-loaded air is supplied at the desired rate of flow by conduit 35. It passes through upper perforated wall 29 of the basket and then through the entire mass of active material which is maintained at the desired temperature by thermostated casing 21, and leaves the contacting unit through perforated wall 30 and reaches outlet chamber 36 from which it is discharged by conduit 39 under the action of fan 40.

With respect to the apparatus of FIG. 1, this apparatus has the advantages of greater simplicity and of needing less frequent changes of active material in the contacting unit.

Thus, it is seen from the above that there are provided by means of the invention a process and apparatus permitting substantially complete removal of the ozone from air loaded with this gas with a very low pressure differential in the circulating fluid.

It is understood that the present invention is not limited to the embodiments described which are given only for illustrative purposes. It is possible, in particular, to locate a plurality of contacting units inside the thermostated casing, or else, should the ozone concentrations be too considerable, it may be advantageous to provide a plurality of apparatus connected in series in the path of the air to be treated rather than to increase the size of a single apparatus and the amounts of active material used therein.

Having now described my invention, what I claim as new and desire to secure by Letters Patent is:

1. Process for removing ozone from air containing added ozone, comprising passing said air containing added ozone through a layer of activated hardwood charcoal in granulated form having a pH of from 12 to 13, so that the pressure differential due to the passage of air through said layer is lower than 200 mm. water, the granular activated charcoal being maintained at a temperature within the range of about 15° C. to about 60° C.

2. Process as claimed in claim 1, wherein the grain size of said hardwood charcoal is from 1 to 20 mm.

3. Process as claimed in claim 1, wherein said pressure differential is less than 10 mm. water.

4. Process as claimed in claim 1, wherein the temperature of said hardwood charcoal is maintained within the range of 25 to 35° C.

5. Process as claimed in claim 1, wherein said hardwood charcoal is obtained from beech, hornbeam or oakwood by high temperature steam treatment.

6. Process as claimed in claim 1, wherein said hardwood charcoal has an ash content from 6 to 12% by weight essentially comprised of potassium carbonate and calcium carbonate.

References Cited

UNITED STATES PATENTS

| 1,961,878 | 6/1934 | Gilkey | 23—4 |
| 2,203,188 | 6/1940 | Beer | 23—4 X |
| 2,980,494 | 4/1961 | Jenkins et al. | 23—4 |
| 3,151,943 | 10/1964 | Fujimato et al. | 23—221 |
| 3,269,801 | 8/1966 | Boberg et al. | 23—4 X |

OTHER REFERENCES

Kirk et al., "Encyclopedia of Chemical Technology," Inter-Science Encyclopedia, Inc., New York, volume 9, 1952, page 736.

EARL C. THOMAS, Primary Examiner

U.S. Cl. X.R.

23—2, 221, 222